(12) United States Patent
Choi

(10) Patent No.: US 7,550,408 B2
(45) Date of Patent: Jun. 23, 2009

(54) EXHAUST GAS PURIFYING CATALYST AND METHOD FOR MANUFACTURING THE SAME

(75) Inventor: Sung Mu Choi, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 419 days.

(21) Appl. No.: 11/304,922

(22) Filed: Dec. 14, 2005

(65) Prior Publication Data

US 2007/0049491 A1    Mar. 1, 2007

(30) Foreign Application Priority Data

Sep. 1, 2005  (KR) ...................... 10-2005-0081452

(51) Int. Cl.
*B01J 32/00* (2006.01)
*B01J 39/20* (2006.01)

(52) U.S. Cl. ............................. 502/439; 55/523; 55/524

(58) Field of Classification Search ........................ None
See application file for complete search history.

(56) References Cited

U.S. PATENT DOCUMENTS

2002/0042344 A1 * 4/2002 Kondo et al. ........... 502/527.19

FOREIGN PATENT DOCUMENTS

| JP | 10-280950 | 10/1998 |
|---|---|---|
| JP | 2002-177794 | 6/2002 |
| JP | 2003-334444 | 11/2003 |

\* cited by examiner

*Primary Examiner*—Melvin C Mayes
*Assistant Examiner*—James Corno
(74) *Attorney, Agent, or Firm*—Morgan, Lewis & Bockius LLP

(57) ABSTRACT

Disclosed is an exhaust gas purifying catalyst having a front end high concentration coating area coated with a precious metal of a high concentration, and a rear end complex coating area coated at different precious metal densities according to the flowing amount of the exhaust gas and a method for manufacturing an exhaust gas purifying catalyst, which is capable of simultaneously coating a rear end complex coating area at different precious metal densities according to the flowing amount of the exhaust gas. The exhaust gas purifying catalyst includes a front end high concentration coating area coated with a precious metal of a high concentration and a rear end complex coating area having at least two areas of different coating densities on the rear side of the front end high concentration coating area.

7 Claims, 7 Drawing Sheets

EXHAUST GAS PURIFYING CATALYST AND METHOD FOR MANUFACTURING THE SAME

CROSS-REFERENCE TO RELATED APPLICATION

This application claims priority to and the benefit of Korean Patent Application 10-2005-0081452 filed in the Korean Intellectual Property Office on Sep. 1, 2005, the entire content of which is incorporated herein by reference.

BACKGROUND OF THE INVENTION

1. Field of the Invention

The present invention relates to an exhaust gas purifying catalyst and a method for manufacturing the same, and more particularly to an exhaust gas purifying catalyst and a method for manufacturing the same which can reduce the manufacturing cost by reducing the used amount of a precious metal coated in the catalyst used to purify the exhaust gas of a vehicle while efficiently purifying the exhaust gas.

2. Description of the Prior Art

Recently, as the number of vehicles and the volume of traffic increases, the problem of air pollution due to exhaust gas has become a severe social problem.

Therefore, the governments of nations have determined discharge standards about exhaust gas contamination materials such as carbon monoxide (CO), hydrocarbon (HC), and nitrogen oxide (NOx), and the restrictions to the exhaust gas are gradually becoming more strictly.

Conventionally, in order to remove harmful materials from the exhaust gas of a vehicle, catalysts coated with precious metals such as platinum (Pt), palladium (Pd), and rhodium (Rh) have been used. The catalysts are mounted to exhaust systems to remove harmful substances from the exhaust gas and purify the exhaust gas by expediting decomposition of hydrocarbon, oxidation of carbon monoxide, and deoxidation of nitrogen oxide.

A uniform coating catalyst obtained by uniformly coating a carrier with a precious metal is well known as an exhaust gas purifying catalyst.

On the other hand, recently, strict regulations on the exhaust gas discharged at the beginning of an engine start have been required. The exhaust gas is known to be discharged by sixty percent at the beginning of the engine start However, in the case of the well known uniform coating catalyst, since the engine is not warmed up sufficiently, the temperature of the exhaust gas is low and a relatively long time is required to reach the light off temperature, thereby lowering the efficiency of the exhaust gas purification at the beginning of the engine start Therefore, catalysts which can be promptly warmed up and activated at the beginning of the engine start are required.

On the other hand, the well known uniform coating catalyst uses a large amount of the precious metal, increasing the manufacturing cost.

FIG. 1 is a view for showing the connection of exhaust manifolds and a catalyst converter of a vehicle. The exhaust manifolds function as passages of the exhaust gas discharged from the cylinders of the engine, and the exhaust gas passes a catalyst converter to which four cylinders are gathered to install a catalyst. However, as shown in FIG. 2, the flow amount of the exhaust gas passing through the catalyst converter varies according to the shapes of the exhaust manifolds. FIG. 2 shows the flow amount of the exhaust gas passed through portions a to d of FIG. 1.

However, since the uniform coating catalyst is coated with precious metal uniformly without considering the flow amount of the exhaust gas, precious metal is wasted on a portion at which the flow amount of the exhaust gas is relatively small. Since the precious metal is a material which has a small yield amount and is expensive, the precious resource can be saved by limiting the used amount of the precious metal, as there is the manufacturing cost of the exhaust gas purifying catalyst to be lowered.

SUMMARY OF THE INVENTION

Accordingly, the present invention has been made to solve the above-mentioned problems occurring in the prior art, and an object of the present invention is to provide an exhaust gas purifying catalyst including a front end high concentration coating area coated with a precious metal of a high concentration, and a rear end complex coating area having areas whose coating densities are varied according to the flow amount of the exhaust gas.

It is another object of the present invention to provide a method for manufacturing an exhaust gas purifying catalyst which can simultaneously coat complex coating areas with a precious metal at different densities according to the flow amount of the exhaust gas.

In order to accomplish this object there is provided an exhaust gas purifying catalyst comprising: a front end high concentration coating area formed by coating an front end portion making contact with the flowing exhaust gas first with a precious metal of a high concentration; and a rear end complex coating area formed on the rear side of the front end high concentration coating area and having at least two coating areas coated with precious metal of different densities.

The front end high concentration coating area occupies about twenty percent of the entire length of the catalyst in the direction in which the exhaust gas is passed to be discharged, and it is preferable that the precious metal coating concentration is about 5.0 g/L.

In the case that the front end portion of the catalyst is coated with the precious metal of a high concentration, the warm-up time of the catalyst can be reduced at the beginning of the engine start. When the exhaust gas flows to the catalyst, the heat is transferred to the front end portion at which the flowing exhaust gas meets the catalyst first. Then, since the front end portion is coated with precious metal of a high concentration, oxidation of the exhaust gas is generated relatively promptly. Since the oxidation is accompanied by a heating reaction, the catalyst is warmed up relatively quickly by the heating reaction. Since the warmed catalyst and exhaust gas warm up the complex coating area quickly, the exhaust gas purifying catalyst reaches the light-off temperature promptly. The heat transfer in the catalyst is performed more promptly by convection rather than conduction, the heat transfer by convection is generated more easily by setting the front end portion of the catalyst to a high concentration coating area.

The rear end complex coating area has a plurality of coating areas coated with precious metal of a concentration lower than the coating concentration of the front end high concentration coating area.

The rear end complex coating area is variously formed according to the flow patterns of the exhaust gas at a position at which the catalyst is installed. A relatively large amount of precious metal is coated at a portion at which the flow amount of the exhaust gas is large, and relatively little precious metal is coated at a portion where the flow amount of the exhaust gas is small.

If a plurality of coating areas having different coating densities are formed at the rear end of the catalyst the precious metal is efficiently distributed according to the flow amount of the exhaust gas, and the amount of the precious metal used can be reduced, with the catalyst having the same purifying efficiency.

Although the rear end complex coating area can have a varied structure which depends on the flow patterns of the exhaust gas, a symmetrical structure is preferable, when considering aspects of canning and the manufacturing convenience of the catalyst converter.

If the flowing resistance is considered, the flowing amount of the exhaust gas is generally large at the center portion of the catalyst. Therefore, the present invention forms the first rear end coating area so as to be coated with a relatively large amount of precious metal, and forms the second rear end coating area so as to be coated with relatively little precious metal.

The present invention suggests an embodiment in which the rear end complex coating area occupies approximately eighty percent of the entire length of the catalyst, the first rear end coating area occupies approximately forty seven percent of the entire volume of the rear end complex coating area, and the second rear end coating area occupies approximately fifty three percent of the entire volume of the second complex coating area. Then, it is preferable that the precious metal coating concentration of the first rear end coating area is approximately 3.0 g/L and the precious metal coating concentration of the second rear end coating area is approximately 1.0 g/L. Further, it is preferable from the aspect of efficient distribution of the precious metal that the precious coating concentration of the first rear end coating area is at least two to four times that of the second rear end coating area.

According to the present invention, the rear end complex coating area is an area simultaneously coated so as to have different coating densities. For that, a partitioning recess of approximately 5 mm is formed along the border of the first and second rear end coating areas on the rear side of the catalyst. A partitioning wall of a coating liquid container in which coating liquids of different densities is contained can be inserted into the partitioning recess, with the container divided by the partitioning wall.

Therefore, the first and second rear end coating areas of the rear end complex coating area can be simultaneously coated by using one coating liquid container in one step.

According to another aspect of the present invention, a method for manufacturing an exhaust gas purifying catalyst, in which a complex coating area having a plurality of coating areas of different precious metal densities is simultaneously coated, is provided.

The present invention includes a step of forming a partitioning wall of a predetermined depth along a border of coating areas at the lower end portion of a carrier coated with a precious metal. A coating liquid container is divided by the partitioning wall so that different coating liquids are contained therein so as not to be mixed, to simultaneously coat the complex coating area. The partitioning wall corresponds to a partitioning recess, and can be inserted into the partitioning recess. Then, it is preferable that the coating liquids of different densities which are contained in spaces of the coating liquid container, and which are divided by the partitioning wall, are contained at the same level.

After the coating liquids of different densities are contained in the spaces divided by the partitioning wall, the partitioning wall is inserted into the partitioning recess so that the carrier is supported by the coating liquid container and the end portion of the carrier makes contact with the coating liquid. Then, if a suction pressure, i.e. a negative pressure is exerted by using a suction device installed on the upper side of the carrier, the carrier is coated with the coating liquid contained in the coating liquid container. Then, the coating liquids of different densities are simultaneously sucked into the coating areas, thereby simultaneously coating the plurality of coating areas.

In order to manufacture the exhaust gas purifying catalyst according to the present invention by using a method for simultaneously coating the plurality of coating areas of different coating densities, the high concentration coating area should be formed at the front end portion of the catalyst first.

Therefore, after the coating container, in which the coating liquid of a high concentration is contained, is provided and then the front end of the catalyst is coated in a high concentration by using a suction pressure, the catalyst is turned and the rear end complex coating area is formed by providing the coating container in which coating liquids of different densities are contained.

According to the exhaust gas purifying catalyst according to the present invention, the catalyst can be activated at the beginning of the engine start and the amount of precious metal used can be efficiently distributed according to the flow of the exhaust gas, thereby minimizing the used amount of the precious metal.

Further, according to the method for manufacturing the exhaust gas purifying catalyst in keeping with the present invention, the complex coating area having the plurality of coating areas of different densities can be coated simultaneously, thereby simplifying the manufacturing process.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, embodiments of the present invention will be described with reference to the accompanying drawings.

Figure 1:
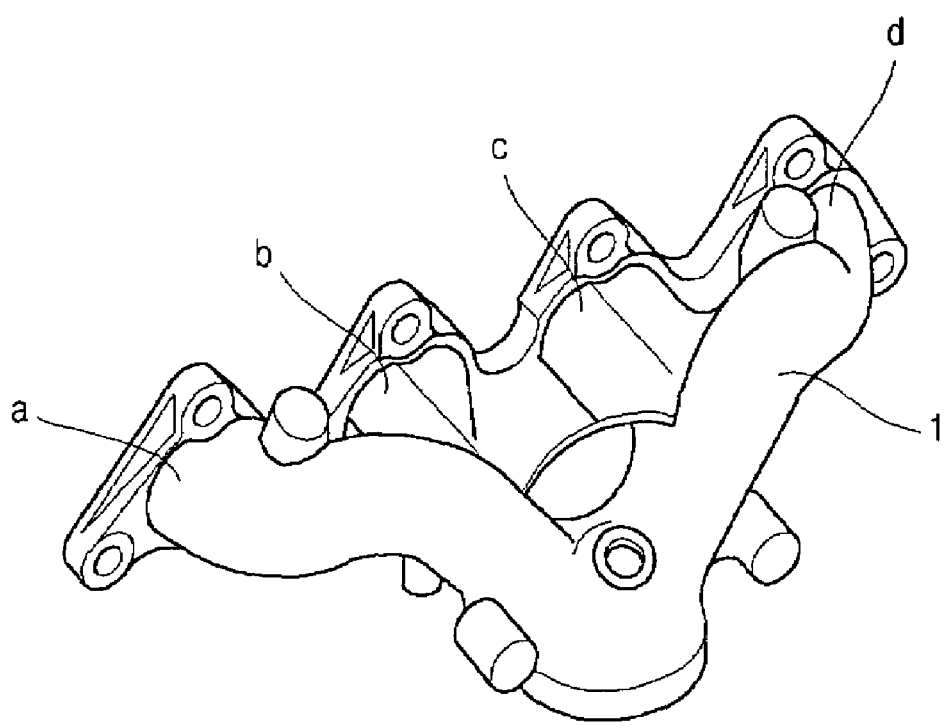
FIG. 1 is a view for showing the connection of exhaust manifolds and a catalyst converter of a vehicle.
Figure 2:
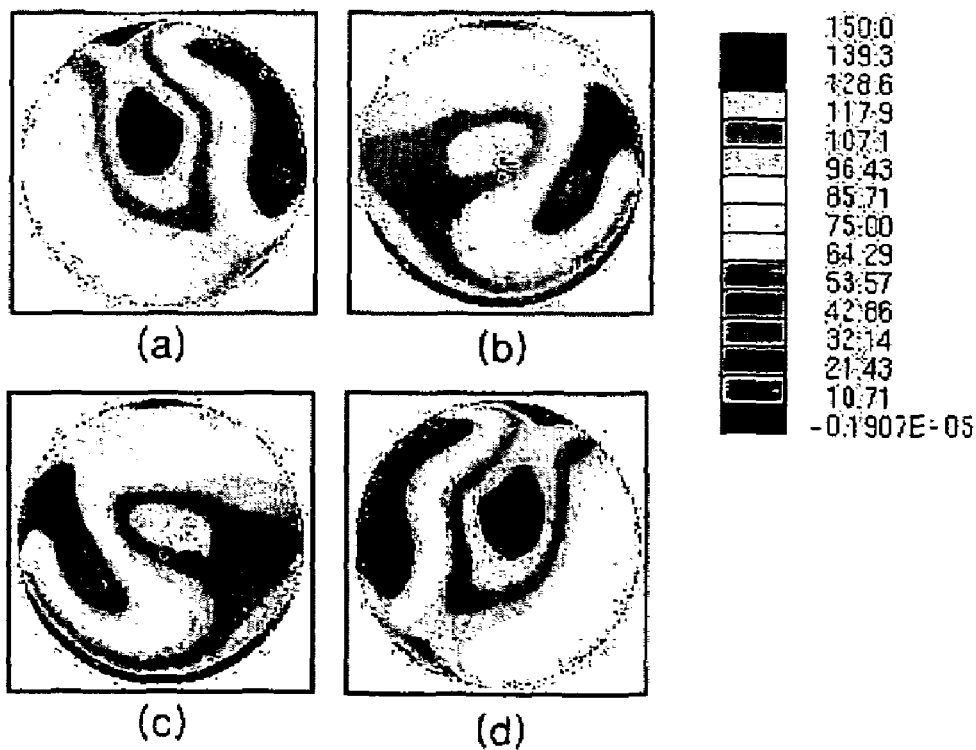
FIG. 2 is view for showing changes of flow amounts of the exhaust gas according to different shapes of exhaust gas manifolds.
Figure 3:
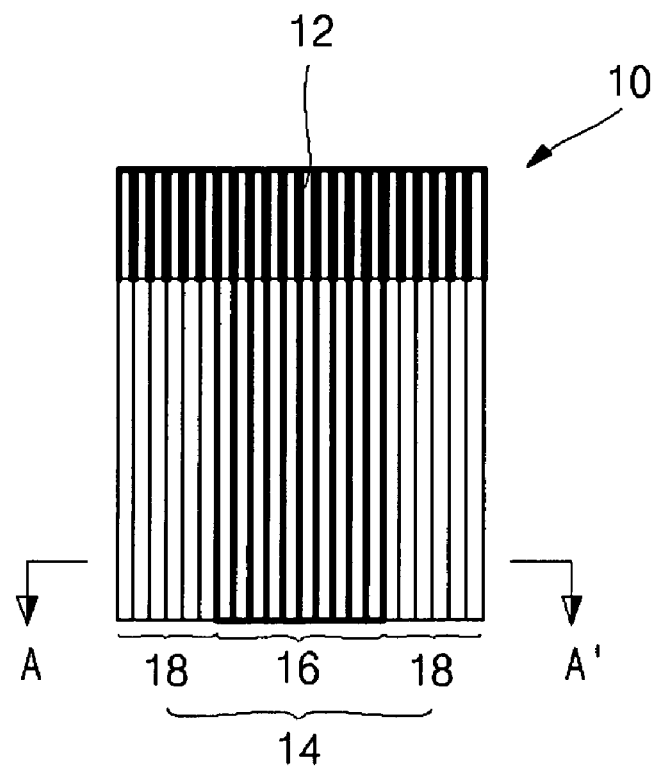
FIG. 3 is a cross-sectional view for showing an exhaust gas purifying catalyst according to the present invention.

FIG. 3 shows an exhaust gas purifying catalyst having a front end high concentration coating area and a rear end complex coating area according to the present invention. The rear end complex coating area includes a first rear end coating area located at the center portion thereof and a second rear end coating area located on the outer side of the first rear end coating area.

The front end high concentration coating area 12 occupies twenty percent of the entire length of the catalyst 10, and the rear end complex coating area 14 occupies eighty percent of the entire length of the catalyst 10. The rear end complex coating area 14 includes the first rear end coating area 16 located at the center portion thereof and a second rear end coating area 18 located on the outer side of the first rear end coating area 16. The first rear end coating area 16 occupies forty three percent of the volume of the rear end complex coating area 14, and the second rear end coating area 18 occupies fifty seven percent of the volume of the rear end complex coating area 14. The precious metal coating densities are determined in the order of the front end high concentration coating area 12, the first rear end coating area 16, and the second rear end coating area 18 from the highest to the lowest The front end of the catalyst 10 is coated in a relatively high concentration to activate the catalyst 10 promptly at the beginning of the start of the engine. The catalyst has low exhaust activation efficiency until it reaches a predetermined light off temperature. However, since the exhaust gas contains the most harmful materials at the beginning the engine start, i.e. when the exhaust gas is cool, the catalyst should be raised to the light off temperature promptly and then be activated to purify the exhaust gas. It can be achieved by coating the front end portion of the catalyst 10 with a precious metal of a concentration of 5.0 g/L, thereby forming the front end high concentration coating area 12.

If the exhaust gas flows and makes contact with the front end portion of the catalyst, oxidation is generated by the catalyst thereby generating heat. Then, since the concentration of the precious metal coated on the front end portion is high, the oxidation and generation of heat occur promptly, thereby activating the catalyst with the heat promptly. Namely, the front end high concentration coating area 12 of the front end portion of the catalyst raises the activation of the catalyst.

The rear end complex coating area 14 minimizes the use of the precious metal by effectively distributing a limited amount of the precious metal according to the flow of the exhaust gas.

The first rear end coating area 16, in which the flow amount of the exhaust gas is large, has a precious metal coating concentration of 3.0 g/L, and the second rear end coating area 18 disposed at the peripheral portion of the catalyst has a precious metal coating concentration of 1.0 g/L.

Since the flow amount of the exhaust gas passing through the second rear end coating area 18 is smaller than the flow amount of the exhaust gas passing through the first rear end coating area 16, the same purification efficiency can be obtained even when the second rear end coating area 18 is coated with a low precious metal concentration, thereby lowering the use of the precious metal.

The used amount of the precious metal of the catalyst according to the present invention will be compared with that of a uniform coating catalyst in which the precious metal is coated on the entire catalyst in a concentration of 3.0 g/L.

The uniform coating catalyst uses 3.0 g of the precious metal.

However, the present invention uses 1 g (5.0 g/L*0.2) at the front end high concentration coating area 12, 1.032 g (3.0 g/L*0.8 L*0.43) at the first rear end coating area 16, and 0.424 g (1.0 g/L*0.8 L*0.53) at the second rear end coating area 18.

Therefore, the exhaust gas purifying catalyst according to the present invention uses only 2.456 g when manufactured, thereby lowering the used amount of the precious metal. Further, since the front end portion of the catalyst 10 has the high concentration coating area to activate the catalyst, the exhaust gas purification efficiency of the catalyst 10 is excellent at the beginning of the engine start.

Figure 4:
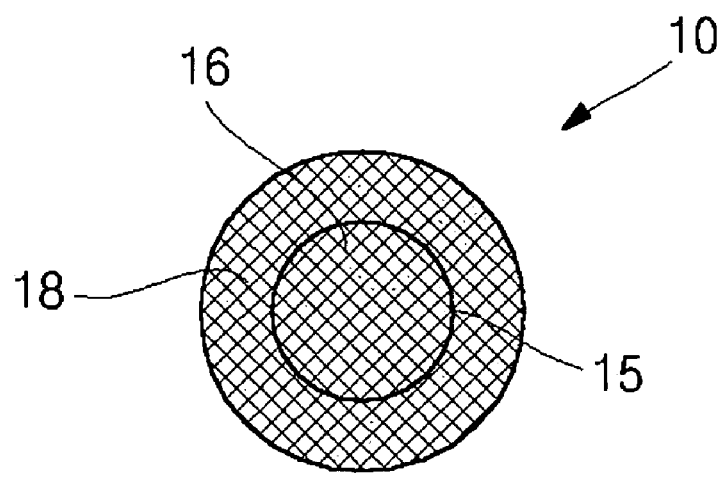
FIG. 4 is a cross-sectional view taken along line A-A' of FIG. 3.

FIG. 4 is a cross-sectional view taken along line A-A' of FIG. 3, and shows a partitioning recess 15 at the lower end portion of the catalyst 10. The partitioning recess 15 is located at the border of the first rear end coating area 16 located on the inner side of the partitioning recess 15 and the second rear end coating area 18 located on the outer side of the partitioning recess 15.

Figure 5:
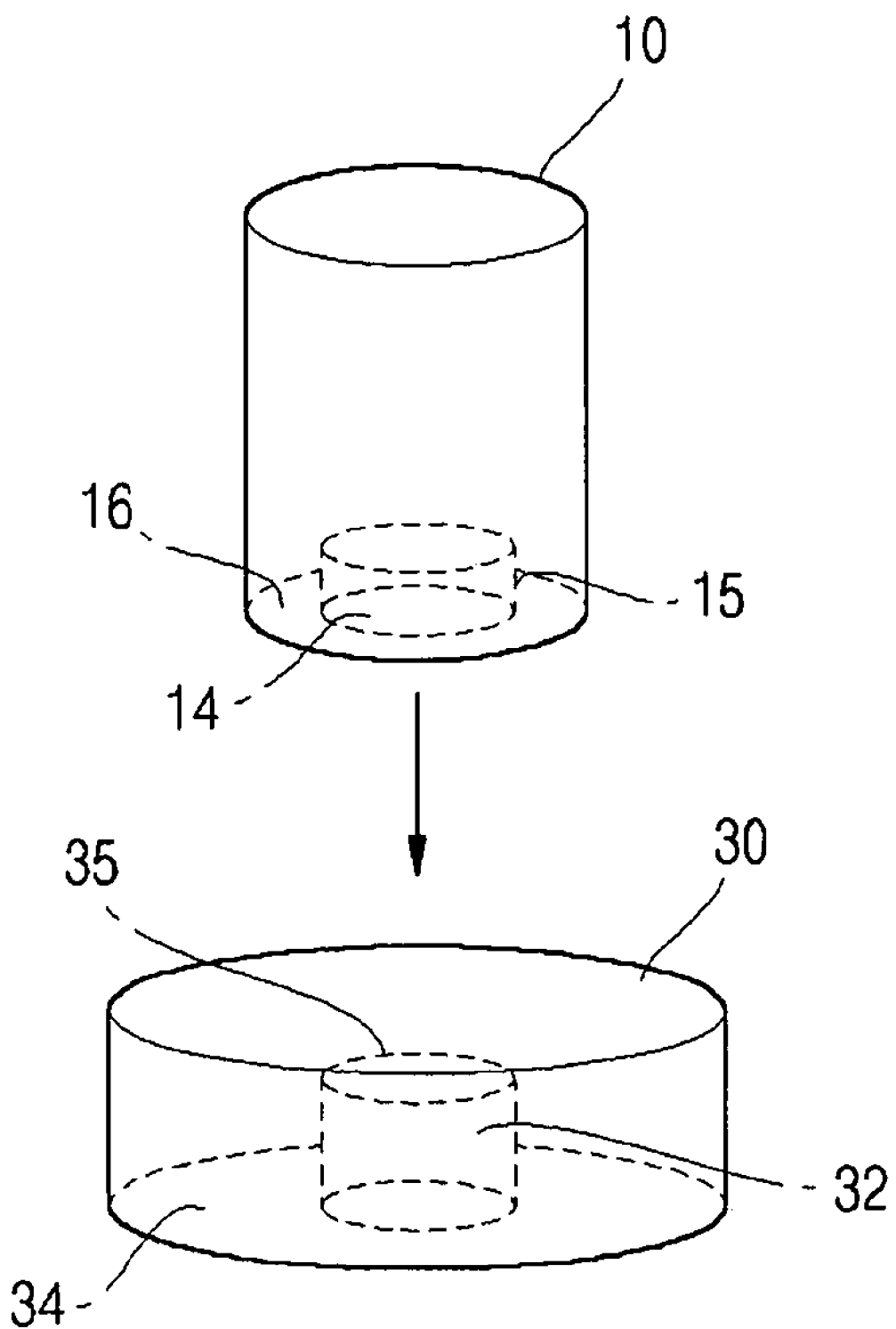
FIG. 5 is a view for showing the operation of a partitioning recess of an exhaust gas purifying catalyst according to the present invention.

The partitioning recess 15 has a length of approximately 5 mm, and a partitioning wall 35 of a coating liquid container 30 can be inserted into the partitioning recess 15, as shown in FIG. 5. In the state in which the partitioning wall 35 is inserted into the partitioning recess 15, the rear end complex coating area 14 is simultaneously coated.

The partitioning wall 35 corresponding to the partitioning recess 15 formed in the catalyst 10 is formed in the interior of the coating liquid container 30, in which the precious metal coating liquid for coating the catalyst is contained.

Since the partitioning wall 35 is formed in the interior of the coating liquid container 30, coating liquids of different densities are contained in spaces 32 and 34 partitioned by the partitioning wall 35. The coating liquid of a relatively high concentration is contained in the space 32 corresponding to the first rear end coating area 16, and the coating liquid of a relatively low concentration is contained in the space 34 corresponding to the second rear end coating area 18.

According to a method for manufacturing the exhaust gas purifying catalyst as exhibited in the present invention, the catalyst is manufactured by simultaneously coating the rear end complex coating area having a plurality of coating areas of different coating densities.

Figure 6A:
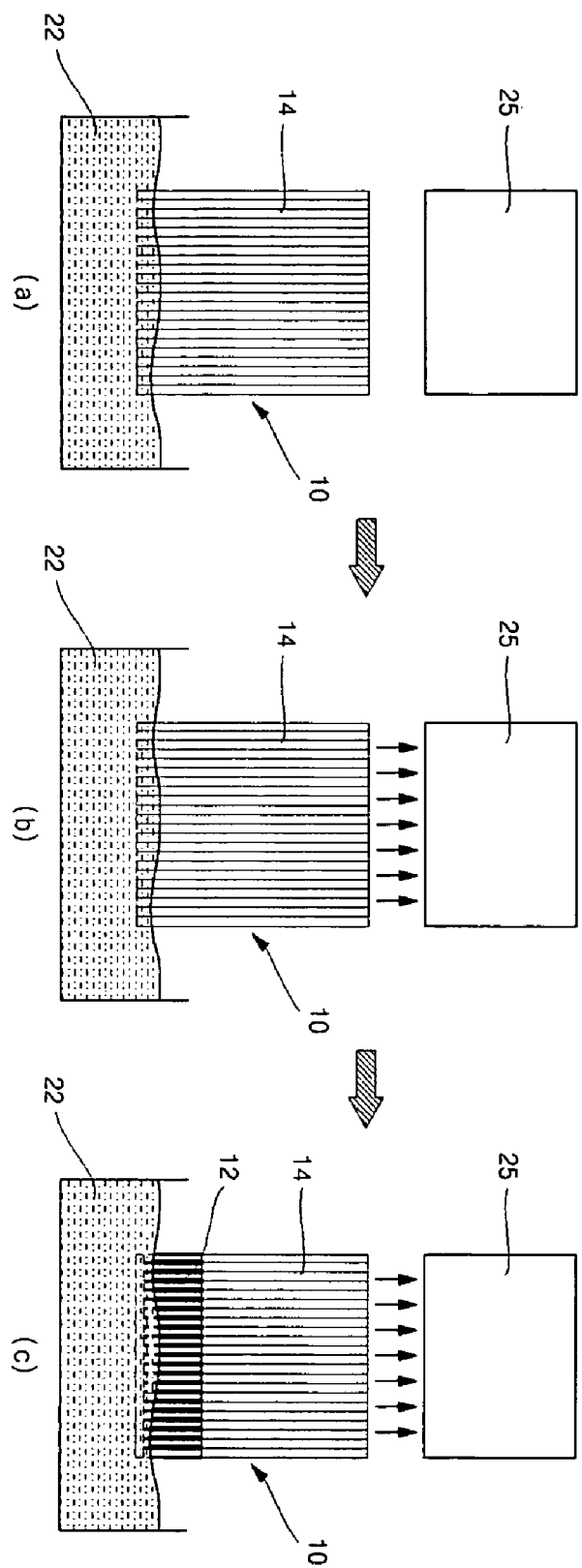
FIGS. 6a to 6c are views for showing a manufacturing method of an exhaust gas purifying catalyst according to the present invention.
Figure 6B:
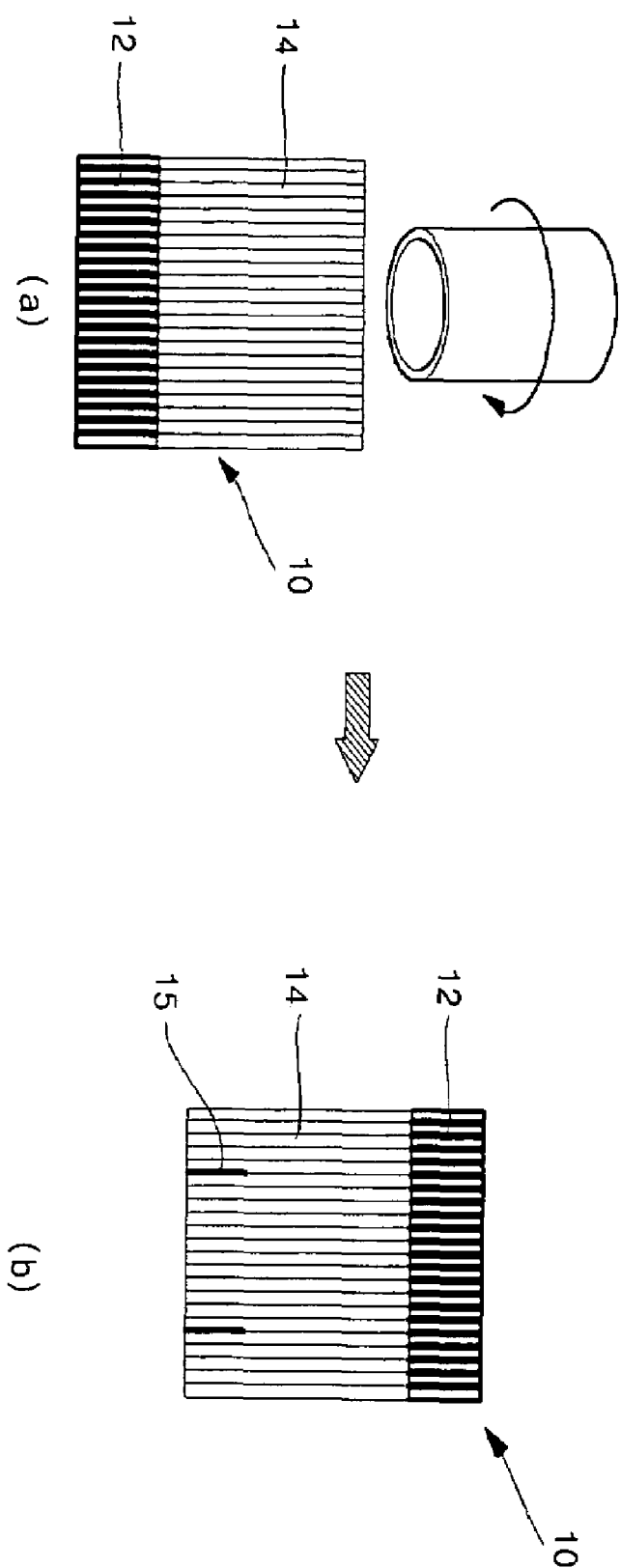
Figure 6C:
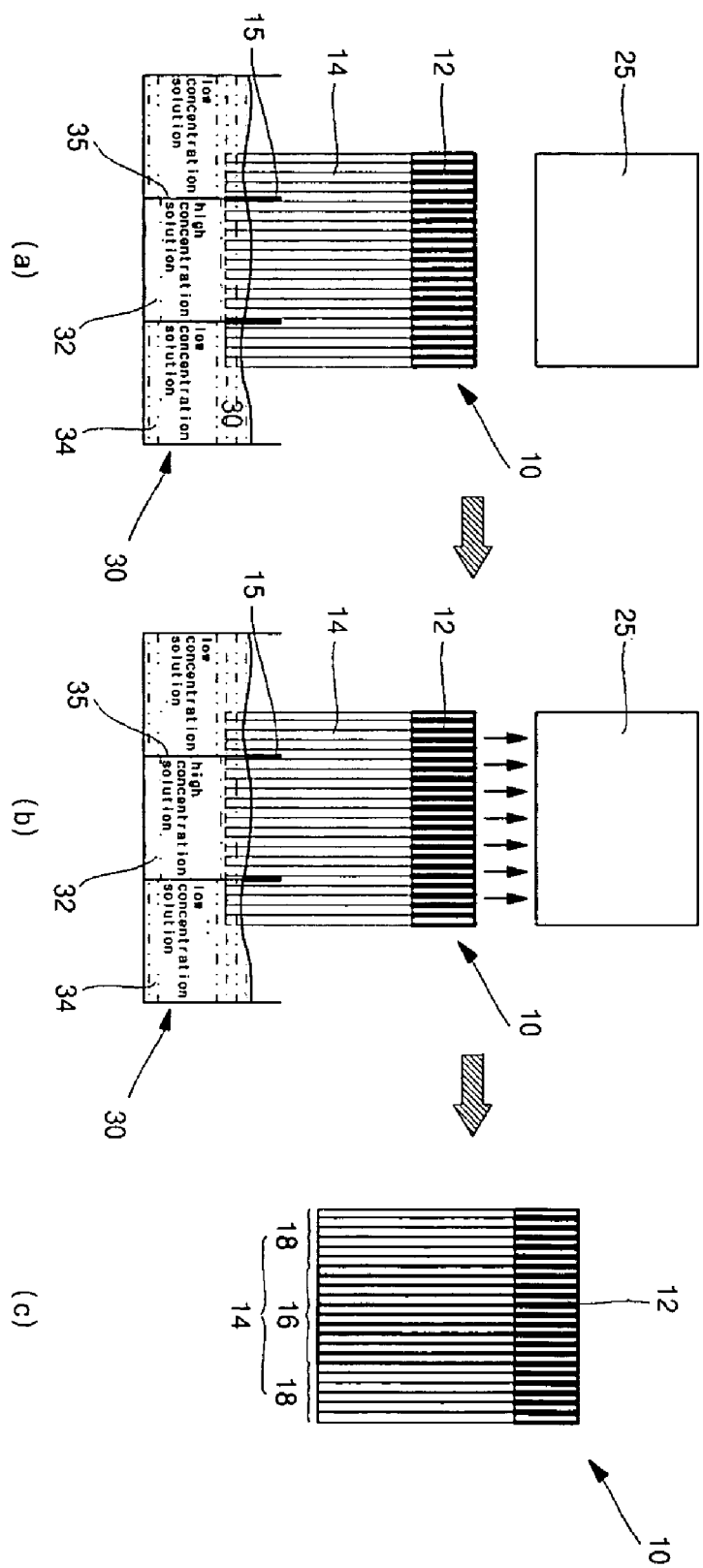

FIGS. 6a to 6c show the manufacturing method of the exhaust gas purification gas according to the present invention.

As shown in FIG. 6a, the front end high concentration coating area is formed by coating the front end portion making contact with the exhaust gas first with the precious metal in a high concentration.

The lower end portion of the catalyst 10 is installed so as to make contact with the coating liquid of a high concentration which is contained in the coating liquid container 22. (refer to (a) of FIG. 6a.) If a suction pressure is provided by using a sucking device 25, the coating liquid of a high concentration is moved upward through the gratings in the interior of the catalyst 10 to coat the catalyst. (Refer to (b) of FIG. 6a.) Then, the front end high concentration coating area 12 of a concentration of 5.0 g/L is formed by coating about twenty percent of the entire length of the catalyst 10 with the high concentration coating liquid. (Refer to (c) of FIG. 6a.)

Thereafter, as shown in FIG. 6b, the partitioning recess 15 is machined at the complex coating area 14 of the catalyst 10 with a tool. (Refer to (a) of FIG. 6b) The partitioning recess 15 is machined so as to be a circular recess since the first rear end coating area 16 has a circular cross-section. The partitioning recess 15 is machined so as to have a depth of 5 mm. The partitioning recess 15 is provided to fix the catalyst to be coated, i.e. a carrier to the coating liquid container 30. (Refer to (b) of FIG. 6b)

Thereafter, as shown in FIG. 6c, another coating liquid container having a partitioning wall 35 at a position corresponding to the partitioning recess 15 so that spaces 32 and 34 in which coating liquids of different densities can be formed is provided. The coating liquids of different densities are contained in the separated spaces of the coating liquid container 30. The partitioning wall 35 corresponds to the partitioning recess 15, and is therefore circular.

The coating liquid of a relatively high concentration to coat the first rear end coating area 16 is contained in the inner space 32 of the circular partitioning wall 35, and the coating liquid of a relatively low concentration to coat the second rear end coating area is contained in the outer space 34 of the circular partitioning wall 35

The catalyst is installed in the coating liquid container 30, and the partitioning wall 35 is inserted into the partitioning recess 15, with the coated front end high concentration coating area of catalyst erected toward the upper side. The lower end of the catalyst 10 is installed so as to make contact with the coating liquid. Therefore, the lower end of the portion at which the second rear end coating area 18 is to be formed and the lower end of the portion at which the first rear end coating area 16 is to be formed are installed so as to make contact with the corresponding coating liquids. (Refer to (a) of FIG. 6c.)

Thereafter, if a suction pressure is exerted by a suction device 25, the coating liquid of a relatively high concentration and the coating liquid of a relatively low concentration are simultaneously moved upward to coat the first rear end coating area 16 and the second rear end coating area 18 simultaneously. (Refer to (b) of FIG. 6c.) Therefore, the first rear end coating area 16 of a concentration of 3.0 g/L and the second rear end coating area 18 are coated simultaneously. (Refer to (c) of FIG. 6c.)

As mentioned above, the present invention provides a method for coating the complex coating area without increasing the number of coating processes.

EXPERIMENTAL EXAMPLE

An activation evaluation has be performed by aging the exhaust gas purifying catalyst manufactured according to the present invention with an electric furnace for 100 hours at a temperature of 1100 degrees Celsius.

Here, a first test material manufactured so that the entire catalyst is uniformly coated in 3 g/L by a conventional uniform coating method and a second test material in which a coating area of a high concentration is formed at the front end and a uniform coating area of a lower concentration is formed at portions on the rear side of the front end and in which 5 g/L is coated at the front end occupying twenty percent of the entire length of the catalyst and 3 g/L is coated at the portions occupying the rest eighty percent are used as compared materials. After the first and second test materials were aged in the same manner as the catalyst according to the present invention, the test has been performed.

Considering the weights of the used precious metal, the catalyst according to the present invention used the precious metal of 2.5 g, the conventional uniform coating method, 3 g, and the front end coating method, 3.4 g.

The experimental result obtained through the above-mentioned experiment is as follows.

Figure 7A:
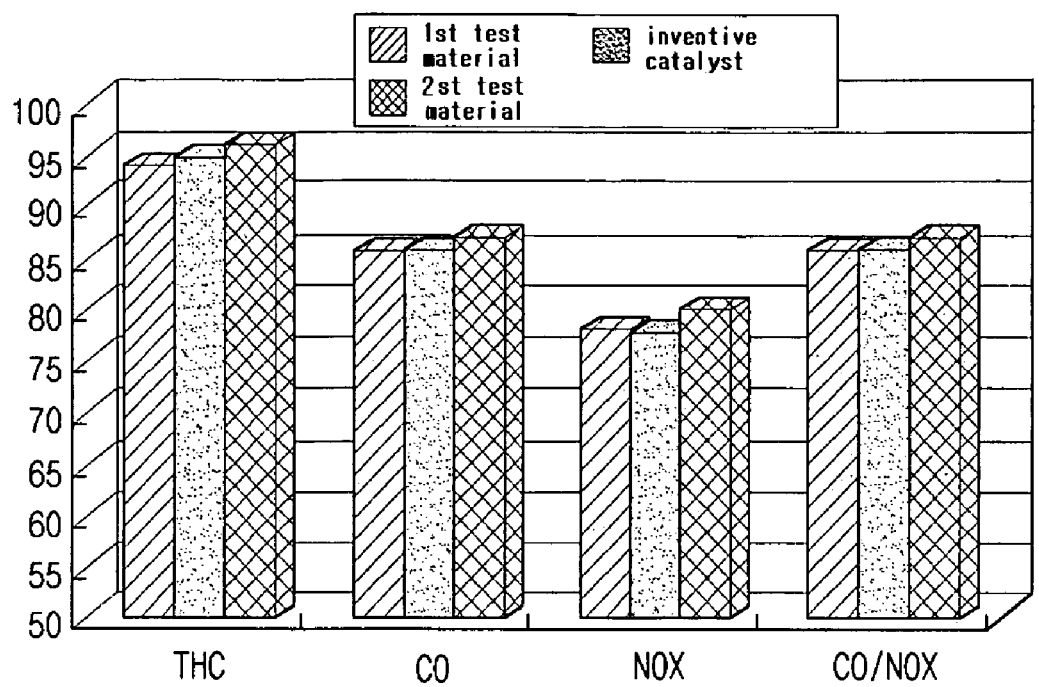
FIGS. 7a and 7b are graphs for comparing a catalyst according to the present invention with first and second test materials.

As can be seen through a graph representing the light-off characteristic of FIG. 7a, the light-off characteristics of the catalyst according to the present invention are superior to the first test material in THC, CO, and NOx, and the used amount of the catalyst is lowered by over ten percent.

If the second test material and the catalyst according to the present invention are compared, the light-off characteristics of the second test material are superior to the catalyst according to the present invention. However, considering that the used amount of the precious metal of the second test material is more than the catalyst according to the present invention by over fifteen percent the light-off characteristics with respect to the used precious metal amount are more excellent in the catalyst according to the present invention than in the second test material. Especially, the light-off characteristics of the two cases are almost the same with respect to the NOx gas.

Figure 7B:
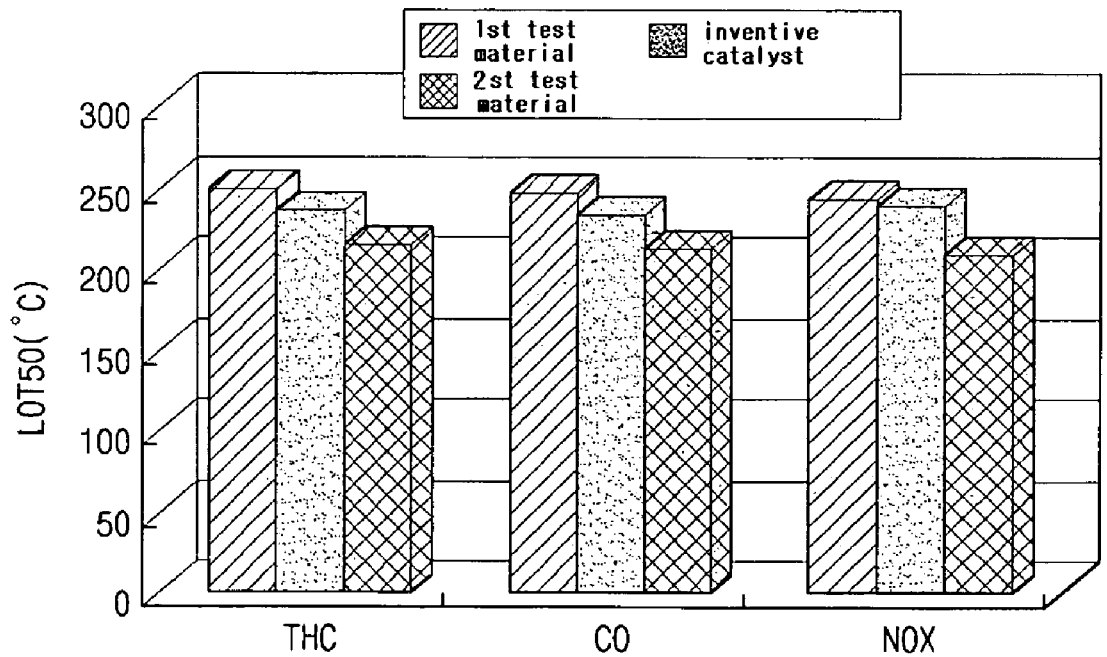

As can be seen through a graph representing the purification rates of FIG. 7b, the exhaust gas THC purification rates are can be ranked from most to least excellent, beginning with the second test material, then the catalyst according to the present invention, and finally the first test material. Further, in regards to the CO and NOx exhaust gas purification rates, the first test material performs almost as well as the catalyst according to the present invention and the second test material is rather somewhat excellent than the first test material and the catalyst according to the present invention.

The important thing in determining the experimental results is the used amount of the precious metal, and the first test material uses 3 g, the second test material, 3.4 g, and the present invention, 2.5 g.

Namely, the present invention uses the least precious metal, has the characteristics more excellent than in the first test material, and has the characteristics almost equal to the second test material. Further, since the light-off characteristics and the purification rates relate to the used amounts of the precious metal, the present invention has the most excellent characteristics with respect to the used amount of the precious metal.

The main object of the present invention is not that the activation of the catalyst is improved by coating large amounts of precious metal, but that the activation of the catalyst can be maximized while the amount of the precious metal is minimized. Therefore, as displayed in the results of the experiments, the present invention is the most excellent based on the above criteria.

The present invention provides an exhaust gas purifying catalyst including a front end high concentration coating area coated with a precious metal of a high concentration and a rear end complex coating area having areas whose coating densities are varied according to the flow amount of the exhaust gas. Therefore, the present invention can reduce the amount of the precious metal coated on a carrier and provides an exhaust gas purifying catalyst having the most excellent characteristics when considering the amount of the precious metal.

Further, since the present invention can coat complex coating areas whose coating densities differ according to the flow amount of the exhaust gas, the number of the coating processes is reduced and efficient coating is enabled.

Although embodiments of the present invention has been described for illustrative purposes, those skilled in the art will appreciate that various modifications, additions and substitutions are possible, without departing from the scope and spirit of the invention as disclosed in the accompanying claims.

What is claimed is:

1. An exhaust gas purifying catalyst comprising:
a front end high concentration coating area formed by coating an front end portion making contact with the flowing exhaust gas first with a precious metal of a high concentration; and
a rear end complex coating area formed on the rear side of the front end high concentration coating area, coated with the precious metal of a concentration lower than the front end high concentration coating area, having a border placed lengthwise according to the flow amount of the exhaust gas, and having at least two coating areas coated with precious metal of different densities;

wherein a partitioning recess, into which a partitioning wall of a coating liquid container containing coating liquids of different densities is inserted, is formed along the border of the coating areas at the rear end of the rear end complex coating area.

2. An exhaust gas purifying catalyst according to claim 1, wherein the rear end complex coating area has a first rear end coating area located at the center portion of the catalyst, at which the flow amount of the exhaust gas is large, and a second rear end coating area located on the outside of the first rear end coating area and having a precious metal coating concentration lower than the first rear end coating area.

3. An exhaust gas purifying catalyst according to claim 2, wherein the first rear end coating area has a precious metal coating concentration twice that of the second rear end coating area.

4. An exhaust gas purifying catalyst according to claim 1 or 2, wherein the coating areas of the rear end complex coating area are coated simultaneously.

5. A method for manufacturing an exhaust gas purifying catalyst having coating areas of different precious metal densities, the method comprising the steps of:

forming a partitioning recess lengthwise at a lower end of a carrier along a border of coating areas;

providing a coating liquid container in which coating liquids of different densities can be contained so as not to be mixed with each other by a partitioning wall partitioning the interior of the container;

inserting the partitioning wall into the partitioning recess so that a carrier can be installed in the coating container with the end side of the carrier in contact with the coating liquids; and coating a plurality of coating areas simultaneously by providing a suction pressure from the upper side of the carrier and coating the coating areas of the carrier with the coating liquids of different densities which is contained in the coating liquid container.

6. A method according to claim 5, wherein the coating liquids of different densities, which are contained in spaces of the coating liquid container, which are separated by the partitioning wall, are contained in the container at a same level.

7. A method according to claim 5, wherein the exhaust gas purifying catalyst having a front end high concentration coating area and a rear end complex coating area is manufactured by providing a coating liquid container in which a coating liquid of a high concentration is contained, installing a carrier so that the front end of the carrier makes contact with the coating liquid of a high concentration, applying a suction pressure from the upper side of the carrier and then coating the front end portion of the carrier so as to be a front end high concentration coating area, and turning the carrier and then coating the rear end portion simultaneously so as to have a plurality of coating areas.

\* \* \* \* \*